United States Patent [19]

Gupta et al.

[11] Patent Number: 5,731,401
[45] Date of Patent: Mar. 24, 1998

[54] PROCESS FOR THE PREPARATION OF THERMOTROPIC AROMATIC POLYESTERS DIRECTLY FROM DIALKYL AROMATIC ESTERS

[75] Inventors: Balaram Gupta, Corpus Christi, Tex.; Matthew J. Bylicki, Hampton, N.J.

[73] Assignee: Hoechst Celanese Corp., Somerville, N.J.

[21] Appl. No.: 723,036

[22] Filed: Sep. 30, 1996

[51] Int. Cl.$^6$ ................................. C08G 63/02
[52] U.S. Cl. .................... 528/194; 528/176; 528/190; 528/192; 528/193
[58] Field of Search ........................... 528/176, 190, 528/192, 193, 194

[56] References Cited

U.S. PATENT DOCUMENTS

| | | |
|---|---|---|
| 4,067,852 | 1/1978 | Calundann . |
| 4,330,668 | 5/1982 | Hideo et al. ................... 528/271 |
| 4,362,858 | 12/1982 | Shimizu et al. ................ 528/125 |
| 4,374,239 | 2/1983 | Berger et al. .................. 528/173 |
| 4,386,186 | 5/1983 | Maresca et al. ............... 525/179 |
| 4,966,958 | 10/1990 | Tacke et al. ................... 528/271 |
| 5,340,908 | 8/1994 | Idage et al. ................... 528/176 |
| 5,539,078 | 7/1996 | Burkett et al. ................ 528/277 |

OTHER PUBLICATIONS

Tsutomu Oishi and H. K. Hall, Jr., Model Studies and a New Melt Polycondensation Route to Poly–Bisphenol A–Iso/terephthalate (Polyarylate), Polyarylates, pp. 83–89.

G. Bier, Polyarylates (polyesters from aromatic dicarboxylic acids and bisphenols), Polymer, 1974, vol. 15, Aug., pp. 527–535.

*Primary Examiner*—Terressa Mosley
*Attorney, Agent, or Firm*—Balaram Gupta

[57] ABSTRACT

A new process is provided for the formation of aromatic polyesters directly from the reaction of dialkyl ester of an aromatic carboxylic acid with dihydric phenols. The polycondensation is carried out in the presence of (a) a condensing agent; (b) a catalyst selected from the group consisting of derivatives of Group I metals, derivatives of Group IV A metals, derivatives of Group IV B metals, and mixtures thereof; and (c) a co-catalyst selected from the group consisting of methanesulfonic acid, sulfuric acid, p-toluenesulfonic acid, alkanoic acid having the formula, $C_nH_xF_yCOOH$, where n is an integer from 1 to 4, x and y are integers from 0 to 2n+1, and the sum of x and y is 2n+1, and mixtures thereof; at suitable temperature and pressure conditions and for a sufficient period of time to form the aromatic polyester.

45 Claims, No Drawings

PROCESS FOR THE PREPARATION OF THERMOTROPIC AROMATIC POLYESTERS DIRECTLY FROM DIALKYL AROMATIC ESTERS

BACKGROUND OF THE INVENTION

1. Field of the Invention

This invention relates to a process for the preparation of aromatic polyesters directly from dialkyl aromatic esters. The present invention particularly relates to the preparation of thermotropic polymers having ester linkages directly from dialkyl aromatic esters.

2. Description of the Prior Art

Aromatic polyesters are a class of polyesters generally made from dihydric phenols and an aromatic diacid(s). A commonly known aromatic polyester is made from a mixture of aromatic diacids such as terephthalic acid and isophthalic acid and bisphenol-A. This polyester is often called as a polyarylate. 2,6-naphthalene dicarboxylic acid has also been used to prepare aromatic polyesters. The polyarylates are high performance thermoplastics and exhibit a good combination of thermal and mechanical properties.

Another particularly important class of aromatic polymers containing ester linkages are thermotropic liquid crystalline polymers (LCP's). Upon heating to sufficiently high temperature, LCP's melt to form a liquid crystalline melt phase rather than an isotropic melt. Generally, LCP's consist of linear ("rigid rod") molecules that can line up to yield the desired liquid crystalline order. As a result, LCP's feature low melt viscosities and thus improved performance and processabilities.

There are at least three major processes known in the literature for the preparation of aromatic polyesters. One procedure employs an interfacial polycondensation of aromatic diacid chlorides with dihydric phenols to form the aromatic polyester. An example of such a polymerization process is described in Japan Pat. 82-96,017, which is hereby incorporated herein by reference in its entirety.

Another polyesterification process involves a melt polycondensation process of dihydric phenol diacetates with aromatic dicarboxylic acids. Examples of such polymerization processes are described in U.S. Pat. No. 4,067,852; U.S. Pat. No. 4,330,668; U.S. Pat. No. 4,374,239; U.S. Pat. No. 4,386,186; which are hereby incorporated herein by reference in their entirety.

Finally, aromatic polyesters have also been prepared by a melt polycondensation of diphenyl esters of aromatic dicarboxylic acids with dihydric phenols in the presence of a catalyst. Examples of such polymerization processes are described in European Pat. Appl. 35,895; European Pat. Appl. 35,897; and U.K. 2,085,450; which are hereby incorporated herein by reference in their entirety.

Prior literature reports a few variations of the diacetate process involving the reaction of a diphenol diacetate with diester derivatives of aromatic dicarboxylic acids. For example, Japan Pat. Appl. 58/215,419 teaches a two step process to produce aromatic polyester by first forming diaryl esters of the aromatic dicarboxylic acids from the reaction of dialkyl esters of aromatic dicarboxylic acids with aryl esters of aliphatic acids; and subsequently reacting the diaryl esters with acyl derivatives of diphenols to form the aromatic polyesters. This process, however, is very complicated since it requires two reaction steps. Moreover, two different waste products are obtained, which must be removed from the polyester.

Another literature reference reports the reaction of a diphenol diacetate with a dimethyl ester of an aromatic diacid (Bier, G., *Polymer*, (1974), pp 527–535). However, this reaction is reported to yield only oligomers. A variation of this process is also reported in U.S. Pat. No. 4,966,958, which discloses that an aromatic polyester of bisphenols with aromatic diacids may be made by heating dialkyl esters of aromatic dicarboxylic acids with bisphenol diesters at 260°–350° C. in the presence of dibutyl tin dilaurate catalyst.

A direct melt condensation of dialkyl esters of aromatic dicarboxylic acids with dihydric phenols has also been reported in U.S. Pat. No. 5,340,908. This process, however, involves a complicated three step process. In the first step, an oligomeric reaction product of dialkylester of terephthalic or isophthalic acid with bisphenol-A was made. The oligomeric product was then purified in the second step, and polycondensed in the third step in the presence of a catalyst to form a polyarylate.

However, none of the literature references described above discloses preparation of thermotropic polymers directly from dialkyl esters of aromatic dicarboxylic acids. More importantly, none of the references mentioned above describes a process for the preparation of aromatic polyesters of moderate molecular weight in a single step from the reaction of dialkyl esters of aromatic dicarboxylic acids with dihydric phenols.

Therefore, the main object of the present invention is to provide a process for the preparation of aromatic polyester(s) using an alkyl ester of an aromatic dicarboxylic acid(s) and a dihydric phenol(s) by a simple one step melt polycondensation technique. An important additional object of the present invention is to provide a process for the preparation of thermotropic LCP's of high enough molecular weight in a single step using an alkyl ester of a dicarboxylic acid. Such a reaction has no precedence in the prior art.

PRIOR ART

The following references are disclosed as background prior art.

U.S. Pat. No. 4,966,958 discloses a process for the preparation of aromatic polyesters by transesterification of aromatic dicarboxylic acid dialkyl esters with diester derivatives of divalent phenols.

U.S. Pat. No. 5,340,908 discloses a process for the preparation of aromatic polyesters by reacting dialkyl esters of terephthalic or isophthalic acids with dihydric phenols.

*Polymer*, (1974), Vol. 15, (pp 527–535) discloses preparation of polyarylates from dimethyl esters of aromatic dicarboxylic acids and diphenol diacetate.

*J. Polym. Sci.: Part A: Polym. Chem.*, (1992), Vol. 30, (pp 83–89) discloses model studies and a new melt polycondensation route to a polyarylate, poly-bisphenol A-iso/terephthalate.

All of the references described herein are incorporated herein by reference in their entirety.

SUMMARY OF THE INVENTION

Surprisingly, it has now been found that an aromatic polyester can be readily formed in a single step directly from the reaction of a dialkyl ester of an aromatic dicarboxylic acid with a dihydric phenol(s) under appropriate conditions as described below. In fact, this novel process has been used to form a few LCP compositions. The LCP's so formed are of high enough molecular weight and can be directly employed in a variety of end use applications such as in the formation of shaped articles by injection molding or to form fibers by extrusion.

The process of the present invention comprises the step of reacting at least one dialkyl ester of an aromatic dicarboxylic acid with one or more of dihydric phenols and a hydroxy aromatic carboxylic acid in the presence of (a) a condensing agent; (b) a catalyst selected from the group consisting of derivatives of Group I metals, derivatives of Group IV A metals, derivatives of Group IV B metals, and mixtures thereof; and (c) a co-catalyst selected from the group consisting of methanesulfonic acid, sulfuric acid, p-toluenesulfonic acid, oxalic acid, alkanoic acid having the formula, $C_nH_xF_yCOOH$, where n is an integer from 1 to 4, x and y are integers from 0 to 2n+1, and the sum of x and y is 2n+1, and mixtures thereof; at suitable temperature and pressure conditions and for a sufficient period of time to form the aromatic polyester.

DETAILED DESCRIPTION OF THE INVENTION

Surprisingly, it has now been found that an aromatic polyester can be readily formed in a single step directly from the reaction of a dialkyl ester of an aromatic dicarboxylic acid with a dihydric phenol(s) under appropriate conditions as described below. In fact, this novel process has been used to form a few LCP compositions. The LCP's so formed are of high enough molecular weight and can be directly employed in a variety of end use applications such as in the formation of shaped articles by injection molding or to form fibers by extrusion.

The process of the present invention comprises the step of reacting at least one dialkyl ester of an aromatic dicarboxylic acid with one or more of dihydric phenols and a hydroxy aromatic carboxylic acid in the presence of (a) a condensing agent; (b) a catalyst selected from the group consisting of derivatives of Group I metals, derivatives of Group IV A metals, derivatives of Group IV B metals, and mixtures thereof; and (c) a co-catalyst selected from the group consisting of methanesulfonic acid, sulfuric acid, p-toluenesulfonic acid, oxalic acid, alkanoic acid having the formula, $C_nH_xF_yCOOH$, where n is an integer from 1 to 4, x and y are integers from 0 to 2n+1, and the sum of x and y is 2n+1, and mixtures thereof; at suitable temperature and pressure conditions and for a sufficient period of time to form the aromatic polyester.

It is contemplated that a wide variety of wholly aromatic polymers may be prepared following the process of the present invention. Two classes of wholly aromatic polymers having ester linkages in their backbone are of particular interest to this invention. One class of polymers is polyarylates which are polyesters of aromatic dicarboxylic acids and bisphenols. Another class of polymers is thermotropic liquid crystalline polymers (LCP's). Both LCP's and polyarylates can have other linkages in addition to ester linkages. Most common mixed linkages that can exist in these polymers are ester-amide, ester-carbonate, ester-ether, ester-imide, ester-sulfone, and mixtures thereof. The preferred polymers that can be made in accordance with the present invention are wholly aromatic polyesters (or polyester-amides). More preferably, thermotropic aromatic polyesters (or polyester-amides) can be made in accordance with the present invention.

The dialkyl esters employable may be selected from the group consisting of alkyl esters of terephthalic acid, isophthalic acid, a naphthalene dicarboxylic acid, a biphenyl dicarboxylic acid, a bis-aryl dicarboxylic acid having the structure:

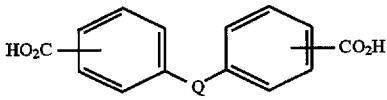

and mixtures thereof, wherein the alkyl group contains 1 to 4 carbon atoms, and Q is independently selected from the group consisting of S, O, CO, SO, $SO_2$, $C(CH_3)_2$ and $C(CF_3)_2$.

The preferred dialkyl esters of aromatic dicarboxylic acids are selected from the group consisting of dimethyl terephthalate, dimethyl isophthalate, dimethyl 2,6-naphthalene-di-carboxylate, dimethyl 4,4'-bibenzoate, and mixtures thereof.

The dihydric phenols employable may be selected from the group consisting of hydroquinone, resorcinol, a biphenol, a dihydroxy naphthalene, bisphenol-A, halosubstituted bisphenol-A, alkyl substituted bisphenol-A, bis-dihydroxy aryl moieties having the structure:

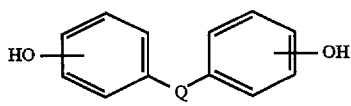

and mixtures thereof, wherein Q is independently selected from the group consisting of S, O, CO, SO, $SO_2$, and $C(CF_3)_2$.

Preferably, the dihydric phenols are selected from the group consisting of hydroquinone, resorcinol, 4,4'-biphenol, 3,4'-biphenol, 2-phenyl hydroquinone, 2,6-dihydroxynaphthalene, 2,7-dihydroxynaphthalene, and mixtures thereof.

The hydroxy aromatic carboxylic acid employable may be 4-hydroxybenzoic acid, 3-hydroxybenzoic acid, 2,6-hydroxynaphthoic acid, 2,7-hydroxynaphthoic acid, 4-(4'-hydroxyphenyl)benzoic acid, 4-(3'-hydroxyphenyl)benzoic acid, and mixtures thereof.

In the present invention, optionally, an aromatic diamine or its derivatives or a hydroxy aromatic amine or its derivatives may be employed as one of the reactive monomers to form polyester-amides. The aromatic diamine or its derivative may be selected from the group consisting of 1,3-diaminobenzene, 1,3-diacetamidobenzene, 1,4-diaminobenzene, 1,4-diacetamidobenzene, 2,6-diaminonaphthalene, 2,6-diacetamidonaphthalene, 2,7-diaminonaphthalene, 2,7-diacetamidonaphthalene, 4,4'-diaminobiphenyl, 4,4'-diacetamidobiphenyl, 3,4'-diaminobiphenyl, 3,4'-diacetamido biphenyl, a bis-aryl diamine or its derivative having the structure:

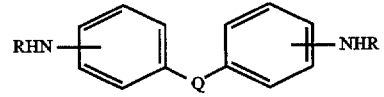

and mixtures thereof, wherein R is either H or —COCH$_3$, and Q is independently selected from the group consisting of S, O, CO, SO, $SO_2$, $C(CH_3)_2$ and $C(CF_3)_2$, and mixtures thereof.

The hydroxy aromatic amine or its derivative may be selected from the group consisting of 1-hydroxy-3-aminobenzene, 1-acetoxy-3-acetamidobenzene, 1-hydroxy-4-aminobenzene, 1-acetoxy-4-acetamidobenzene, 2-hydroxy-6-aminonaphthalene, 2-acetoxy-6- acetamidonaphthalene, 2-hydroxy-7-aminonaphthalene, 2-acetoxy-7-acetamidonaphthalene, 4-hydroxy-4'-aminobiphenyl, 4-acetoxy-4'-acetamidobiphenyl, 3-hydroxy-4'-aminobiphenyl, 3-acetoxy-4'-acetamidobiphenyl, a bis-aryl hydroxy amine or its derivative having the structure:

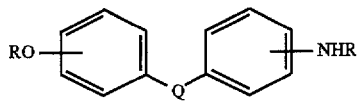

and mixtures thereof, wherein R is either H or —COCH$_3$, and Q is independently selected from the group consisting of S, O, CO, SO, SO$_2$, C(CH$_3$)$_2$ and C(CF$_3$)$_2$, and mixtures thereof.

Optionally, one or more of the hydrogen atoms on the aromatic rings of these molecules may be replaced with substituents independently selected from the group consisting of Br, F, Cl, I, phenyl, tolyl, alkyl and fluoroalkyl groups having the formula $C_nH_xF_y$, where n is an integer from 1 to 4, x and y are integers from 0 to 2n+1, and the sum of x and y is 2n+1. Preferably, the aromatic rings are unsubstituted except for the specified functional groups as described above.

Generally, stoichiometric equivalent amounts of dicarboxylic acids or its diesters and dihydric phenols or aromatic hydroxyamines or diamines or its derivatives are employed. Typically, the polyarylate compositions may be made by reacting one or more of a diakyl ester of an aromatic dicarboxylic acid with one or more of a dihydric phenol. Optionally, such polyarylate compositions may additionally contain one or more of a hydroxy aromatic carboxylic acid as described hereinabove. The thermotropic polymers are made from at least one molecule of a dialkyl ester of an aromatic dicarboxylic acid in combination with one or more of aromatic dicarboxylic acids in stoichiometric amounts with one or more of dihydric phenols, or aromatic hydroxy amines or its derivatives, or aromatic diamines or its derivatives. Such thermotropic polymer compositions also contain at least one or more of a hydroxy aromatic carboxylic acid as described hereinabove. Preferred thermotropic polymers are polyesters or polyesteramides made according to the present invention employing appropriate combinations of monomers as described hereinabove.

In accordance with the present invention, the polycondensation reaction is carried out in the presence of a condensing agent. A wide variety of condensing agents known in the art may be employed. Most commonly used condensing agent is an alkanoic acid anhydride of the formula, $(C_nH_xF_yCO)_2O$, where n is an integer from 1 to 4, x and y are integers from 0 to 2n+1, and the sum of x and y is 2n+1. Examples of such condensing agents are acetic anhydride, n- or iso-propionic anhydride, n-, iso- or tert-butyric anhydride, trifluoroacetic anhydride, perfluorobutyric anhydride, and the like. The preferred condensing agent is acetic anhydride.

The catalyst employed may include derivatives of Group I metals, derivatives of Group IVA metals, derivatives of Group IVB metals, and mixtures thereof. These may be preferably lithium acetate, sodium acetate, potassium acetate, cesium acetate, stannic acid, butylstannoic acid, stannous octanoate, dibutyltin oxide, tin butoxide, dibutyltin diesters, di-n-butyl tin dilaurate, titanium tetrabutoxide, titanium propoxide, titanium phenoxide, zirconium butoxide, silicon phenoxide, and mixtures thereof. The amount of catalyst employed depends upon the nature of the catalyst. For example, when dibutyl tin oxide is employed as the catalyst, the amount that can be used ranges from about 100 parts per million to about 3000 parts per million based on the total weight of the aromatic polyester (polyester-amide) that is being formed. Whereas, if potassium acetate is used as the catalyst much lower amounts of catalyst may be employed. Preferred amounts of potassium acetate ranges from about 60 parts per million to about 300 parts per million based on the total weight of the aromatic polyester (or polyester-amide) that is being formed.

The typical co-catalyst used in the present invention is acetic acid or trifluoroacetic acid. The preferred co-catalyst is acetic acid. The amount of acetic acid employed ranges from about 30 mol % to about 300 mol % with reference to the dialkyl ester of an aromatic dicarboxylic acid. However, when trifluoroacetic acid (TFA) is used as the co-catalyst, much lower mounts of TFA is found to be equally effective. Thus the mount of TFA employed ranges from about 20 mol % to about 80 mol % with reference to the dialkyl ester of an aromatic dicarboxylic acid.

In one specific embodiment, the polycondensation is carried out in the presence of acetic anhydride as the condensing agent to form a thermotropic polymer composition. The catalyst and co-catalyst employed were, respectively, dibutyl tin oxide and acetic acid. The polymerization reaction was conducted in a programmed manner. In this embodiment, it was found that use of a vacuum jacketed vigreux column was extremely beneficial in order to allow the vapors to reflux. The polymerization may be conducted at different pressures ranging from atmospheric pressure to sub-atmospheric pressure. Generally one atmosphere (760 mm of Hg=1 bar) is maintained during the initial phase and subsequently the pressure is reduced to a value in the order of 10 to 1 mbar or even lower in a phased manner during the final phase of the polycondensation.

The temperatures of reaction may range from 100° to 380° C. or higher. Often temperature profile of 110° to 350° C. is ideal for smooth running of the polymerization reaction. The hydroxy or amino groups will react with acetic anhydride at around 110°–160° C. to form acetates or acetamides. Therefore, sufficient amounts of acetic anhydride must be used such that all of the hydroxy or amino groups are acetylated. Thus on a mole basis equal molar amount of acetic anhydride is used per mole of hydroxy or amino group; often a slight excess of acetic anhydride, as for example about 2.5% to 5.0% excess, is used. Reaction time may be varied from 2 to 20 hrs, preferably between 6 to 10 hrs range.

The polymer prepared using the present invention commonly exhibits a weight average molecular weight ($M_w$) ranging from about 2,000 to about 100,000, and typically from about 5,000 to about 50,000. The polymer prepared according to the present invention commonly exhibits a number average molecular weight ($M_n$) ranging from about 1,000 to about 50,000, and typically from about 2,500 to about 25,000. The molecular weights are determined by gel permeation chromatography (GPC).

The thermotropic polymer derived from the present invention commonly exhibits an inherent viscosity (IV) of at least about 1.0 dL/g, and typically from about 1.5 to about 10.0 dL/g when measured in a concentration of 0.1 weight % solution in equal parts by volume of hexafluoroisopropanol and pentafluorophenol at 25° C.

The process of the present invention has been found to be capable of forming thermotropic polymer compositions directly from dialkyl esters of aromatic dicarboxylic acids, for example, dimethyl 2,6-naphthalene dicarboxylate, which is hereto unknown in the prior art. The resulting product advantageously is found to exhibit high enough molecular weight and is capable of forming shaped articles by injection molding or by extrusion without any additional post treatment of the product.

The product of the present invention may optionally incorporate approximately 1 to 50 percent by weight (preferably approximately 10 to 30 percent by weight), based upon the total weight of the polymers, of a solid filler and/or reinforcing agent. Representative filler materials include calcium silicate, silica, clays, talc, mica, polytetrafluoroethylene, graphite, alumina trihydrate, sodium aluminum carbonate, barium ferrite, wollastonite, etc. Representative reinforcing fibers include glass fibers, graphitic carbon fibers, amorphous carbon fibers, synthetic polymeric fibers, alumina fibers, aluminum silicate fibers, aluminum oxide fibers, titanium fibers, magnesium fibers, rock wool fibers, steel fibers, tungsten fibers, wollastonite fibers having an aspect ratio greater than 3 to 1, cotton, wood, cellulose fibers, etc.

In preferred embodiments quality three-dimensional articles are formed upon melt processing which exhibit a heat deflection temperature at 264 psi of at least 220° C. (most preferably at least 240° C.), and a Notched Izod impact strength of at least 1.0 ft.-lb./in. (most preferably at least 1.3 ft.-lb./in.).

This invention is further illustrated by the following examples which are provided for illustration purposes and in no way limit the scope of the present invention.

EXAMPLES (General)

In the Examples that follow, the following abbreviations are used:
HBA—4-hydroxybenzoic acid
DMNDC—Dimethyl 2,6-naphthalene-di-carboxylate
TA—Terephthalic acid
HQ—Hydroquinone
AA—1-Acetoxy-4-acetamidobenzene
HOAc—Acetic acid
TFA—Trifluoroacetic acid
KOAc—Potassium acetate
DBTO—Dibutyl tin oxide
IV—Inherent viscosity
dL/g—deciliters per gram; an unit of measure of IV
wt %—weight per cent; generally used to represent the concentration of a solution to measure IV—means grams of polymer in 100 mL of a solvent mixture.
MV—Melt viscosity
DSC—Differential Scanning Calorimetry
TS—Tensile Strength
TM—Tensile Modulus
E—Elongation
FS—Flexural Strength
FM—Flexural Modulus
NIZOD—Notched IZOD impact strength
ft.-lb./in.—foot-pound/inch; an unit of measure of impact strength
HDT—Heat Deflection Temperature
General Analytical Techniques Used for the Characterization of the Polymer: A variety of analytical techniques were used to characterize the polymer prepared according to the present invention which included the following:

IV: The solution viscosity of the polymer samples, IV, was measured at 25° C. in a concentration of 0.1 wt % solution in equal parts by volume of pentafluorophenol and hexafluoroisopropanol.

MV: MV of polymer samples was measured using a Kayeness Melt Rheometer Model 2052 equipped with a Hastalloy barrel and plunger tip. The radius of the die orifice was 0.015 inch and the length was 1 inch. For the purpose of determining melt viscosities, a plot of viscosity vs. shear rate was generated by measuring the viscosities at shear rates of 56, 166, 944, 2388, and 8333 sec$^{-1}$, and viscosities at 100 and 1000 sec$^{-1}$ were interpolated.

DSC: DSC of polymer samples was performed on a Perkin Elmer 7700 Thermal Analysis System. In all runs the samples, sealed in aluminum pans, were heated or cooled at a rate of 20° C./min. under a nitrogen atmosphere. The DSC curves obtained from the second heating run were taken for the analysis.

Light Microscopy: Samples were prepared for microscopic analysis by thin sectioning using a glass knife microtome. The sections were examined by polarized light microscopy to observe morphological behavior at elevated temperatures. The thin sections of the polymer samples were held between quartz cover slips and heated at a rate of 20° C./min. to a maximum temperature of 420° C. followed by rapid quenching. The results were video taped and micrographs were obtained from the video tape at four different temperatures: (A) room temperature; (B) 290°–310° C.; (C) 330°–350° C.; and (D) 380°–400° C.

Compounding and Molding: Polymers prepared in accordance with the present invention were compounded with standard fiber glass filler (sold by Owens Corning as OCF 491AA, ⅛" chopped strand) on a Werner and Pfleiderer ZSK 28 mm extruder. The glass filled resins were molded into test specimens on a BOY 30M injection molding machine and tested in accordance with the ASTM procedures as follows: tensile properties (TS, TM, and E) were measured in accordance with ASTM No. D638; flexural properties (FS and FM) were measured in accordance with ASTM No. D790; notched Izod (NIZOD) impact was measured in accordance with ASTM No. D256; and HDT was measured in accordance with ASTM No. D648.

Fibers: Fibers were spun from the molten polymer at about 10°–20° C. above the polymer's melting transition by extruding through a single hole spinneret (0.005 inch diameter and 0.007 inch length) at a rate of 0.15 grams/minute. The extruded filament was drawn typically at a speed of 700 meters/minute and quenched in air at ambient conditions (about 25° C. and 65% relative humidity). The as-spun fiber was typically heat treated in stages, generally, heating to a final temperature of about 300° C. in about 8 to 24 hours. The tensile properties of the as-spun and heat treated fiber were measured using ASTM test method D3822 (1 inch gauge length).

Example 1

In a three neck 4 liter glass reactor immersed in a sand bath and equipped with a nitrogen inlet, thermocouple, a vacuum jacketed large vigreux column attached to a condenser and receiver, and C shaped 316 stainless steel mechanical stirrer were placed (a) 552 grams (4 moles) of HBA (b) 488 grams (2.0 moles) of DMNDC, (c) 166 grams (1.0 moles) of TA, (d) 247.5 grams (2.25 moles) of HQ, (e) 113.3 grams (0.75 moles) of AA, and (f) 1.25 grams (960 ppm as DBTO or 480 ppm as Sn in the resulting polymer) of DBTO under a constant purge of nitrogen (30–40 cc/min.). The reactor was evacuated to approximately 1 to 2 mbar followed by breaking the vacuum with nitrogen. The vacuum-nitrogen purging process was repeated twice and 977.7 grams (9.25 moles, +2.5 mol % excess of 99 mol % purity) of acetic anhydride and 300 grams (5.0 moles) of acetic acid were introduced into the reactor through an addition funnel. The reactor was then heated in stages using MicRIcon controller as follows:

| Heating Stage No. | Temperature, °C. | Elapsed Time minutes |
| --- | --- | --- |
| 1 | 25 | 1 |
| 2 | 110 | 30 |
| 3 | 160 | 40 |
| 4 | 180 | 20 |
| 5 | 210 | 70 |
| 6 | 220 | 40 |
| 7 | 250 | 30 |
| 8 | 290 | 50 |
| 9 | 310 | 30 |
| 10 | 330 | 30 |
| 11 | 340 | 10 |
| 12 | 340 | 60 |

The acetic acid began distilling-off when the reactor was around 150° C. and about 95% of theoretical amount of acetic acid (1470 mL) had evolved at the beginning of heating stage 12. The polymer turned dark around 320°–340° C. and gaseous vapors appeared in the vigreux column around this time. The reaction mixture was white in color until the reaction temperature reached to about 280° C. The nitrogen purge was then turned off and the reactor was evacuated to about 6 mbar. The torque on the stirrer started to raise and the reaction was terminated when an increase in torque of 80 mvolts from the initial value was attained (took about 75 minutes to reach this torque from the start of vacuum). During this time lots of waxy solids also distilled and caused problems by plugging the receiver end of the condenser. The reactor was cooled and broken to obtain 1157 grams (89% yield) of polymer. The polymer was cut and ground into chips for analysis.

The resulting polymer exhibited an IV of 2.7 dL/g when dissolved in a concentration of 0.1 wt % in equal parts by volume of pentafluorophenol/hexafluoroisopropanol solvent mixture at 25° C. The polymer exhibited the following properties as determined by DSC:

| | |
| --- | --- |
| Melting Point (Tm): | 304° C.; |
| Heat of Melting (Hm): | 3.9 joules/gram; |
| Crystallization Point (Tc): | 260° C. |
| Heat of Crystallization (Hc): | −2.8 joules/gram |

The MV of the polymer at 310° C. was as follows:

| Shear Rate | MV |
| --- | --- |
| 100 sec$^{-1}$ | 2317 poise |
| 1000 sec$^{-1}$ | 738 poise |

The polymer melt also exhibited very fine nematic texture as observed by polarized light microscopy, and the nematic texture was retained after quenching to ambient temperature. The polymer exhibited a bimodal molecular weight distribution; one peak was observed around weight average molecular weight, $M_w$, of about 20,000, and another peak was observed around weight average molecular weight, $M_w$, of about 100,000 as determined by the gel permeation chromatography (GPC).

When molten at 310° to 330° C. the polymer was extruded through a single hole spinneret as described above to form a fiber sample. The as-spun fiber properties were as follows:

| | |
| --- | --- |
| Tenacity (T): | 3.1 gm/denier; |
| Elongation (E) | 1.1%; |
| Modulus (M) | 340 gm/denier |

A portion of the polymer sample was compounded with 30% by weight glass fibers and injection molded into test bars as mentioned above. The results of the testing are shown below:

| | |
| --- | --- |
| TS, kpsi | 17 |
| E, % | 0.9 |
| TM, kkpsi | 2.4 |
| FS, kpsi | 27 |
| FM, kkpsi | 2.1 |
| NIZOD, ft.-lb./in. | 1.3 |
| HDT, °C. @ 264 psi | 253 |

Example 2

Example 1 was substantially repeated with the exception that the reaction was conducted in the presence of 0.63 grams (480 ppm as DBTO or 240 ppm as Sn in the resulting polymer) of DBTO. The torque on the stirrer during vacuum stage increased only by about 12 mvolts. The polymer properties were as follows:

| | |
| --- | --- |
| IV | 1.7 dL/g; |
| Tm | 288° C.; |
| Hm | 3.2 joules/gram; |
| Tc | 252° C. |
| Hc | −3.3 joules/gram |

The MV of the polymer at 290° C. was as follows:

| Shear Rate | MV |
| --- | --- |
| 100 sec$^{-1}$ | 2729 poise |
| 1000 sec$^{-1}$ | 682 poise |

The resulting polymer was melt spun into single filament fiber at a melt temperature of about 310° C. as described in Example 1. The as-spun fiber properties were as follows:

| | |
| --- | --- |
| Tenacity (T): | 2.9 gm/denier; |
| Elongation (E) | 1.1%; |
| Modulus (M) | 341 gm/denier |

Examples 3 and 4

Example 1 was substantially repeated in Examples 3 and 4. The polymer properties were as follows:

| | Example 3 | Example 4 |
| --- | --- | --- |
| IV, dL/g | 2.7 | 3.1 |
| Tm, °C. | 294 | 303 |
| Hm, joules/gram | 3.1 | 2.3 |
| Tc, °C. | 251 | 257 |
| Hc, joules/gram | −1.8 | −2.6 |

The MV of the polymer at 310° C. was as follows:

| Shear Rate | Example 3 | Example 4 |
|---|---|---|
| 100 sec$^{-1}$ | 1129 poise | 3637 poise |
| 1000 sec$^{-1}$ | 545 poise | 1092 poise |

The resulting polymer in each of the Examples 3 and 4 was compounded with 30 wt % glass fibers and molded into test bars as described in Example 1. The results of the testing were as follows:

|  | Example 3 | Example 4 |
|---|---|---|
| TS, kpsi | 16.6 | 17.9 |
| E, % | 0.9 | 1 |
| TM, kkpsi | 2.2 | 2.3 |
| FS, kpsi | 24.8 | 28.4 |
| FM, kkpsi | 2 | 2.3 |
| NIZOD, ft.-lb./in. | 1.4 | 1.4 |
| HDT, °C. @ 264 psi | 248 | 254 |

Examples 5 and 6

Example 1 was substantially repeated in Examples 5 and 6 with the exception that TFA was used as the co-catalyst in the following amounts:

|  | Example 5 | Example 6 |
|---|---|---|
| TFA | 142.5 grams, 1.25 moles | 71.3 grams, 0.63 moles |

The polymer properties were as follows:

|  | Example 5 | Example 6 |
|---|---|---|
| IV, dL/g | 2.1 | 2.4 |
| Tm, °C. | 288 | 303 |
| Hm, joules/gram | 3 | 2.9 |
| Tc, °C. | 250 | 259 |
| Hc, joules/gram | −2.4 | −2 |

The MV of the polymer at 310° C. was as follows:

| Shear Rate | Example 5 | Example 6 |
|---|---|---|
| 100 sec$^{-1}$ | 772 poise | 2050 poise |
| 1000 sec$^{-1}$ | 417 poise | 711 poise |

The resulting polymer in each of the examples 5 and 6 was compounded with 30 wt % glass fibers and molded into test bars as described in Example 1. The results of the testing were as follows:

|  | Example 5 | Example 6 |
|---|---|---|
| TS, kpsi | 16 | 18.4 |
| E, % | 0.7 | 0.8 |
| TM, kkpsi | 2.5 | 2.6 |
| FS, kpsi | 23.7 | 27 |
| FM, kkpsi | 2.1 | 2.3 |
| NIZOD, ft.-lb./in. | 1.3 | 1.6 |
| HDT, °C. @ 264 psi | 240 | 247 |

The polymer sample from Example 5 was melt spun into single filament fiber at a melt temperature of about 330° C. as described in Example 1. The as-spun fiber properties were as follows:

| Tenacity (T): | 1.8 gm/denier; |
|---|---|
| Elongation (E) | 0.8%; |
| Modulus (M) | 252 gm/denier |

The polymer sample from Example 6 was not spinnable into a single filament fiber at 330° to 370° C. temperature range.

Example 7

Example 1 was substantially repeated in Example 7 with the exception that 0.39 grams of KOAc was used as the catalyst, which amounted to 300 parts per million of KOAc or 120 parts per million of K in the resulting polymer. The polymer properties were as follows:

| IV, dL/g | 2.6 |
|---|---|
| Tm, °C. | 304 |
| Hm, joules/gram | 4.7 |
| Tc, °C. | 253 |
| Hc, joules/gram | −2.9 |

The MV of the polymer at 310° C. was as follows:

| 100 sec$^{-1}$ | 1370 poise |
|---|---|
| 1000 sec$^{-1}$ | 518 poise |

The resulting polymer was compounded with 30 wt % glass fibers and molded into test bars as described in Example 1. The results of the testing were as follows:

| TS, kpsi | 20 |
|---|---|
| E, % | 1 |
| TM, kkpsi | 2.4 |
| FS, kpsi | 25.8 |
| FM, kkpsi | 2.1 |
| NIZOD, ft.-lb./in. | 1.4 |
| HDT, °C. @ 264 psi | 261 |

The resulting polymer was melt spun into single filament fiber at a melt temperature of about 310° C. as described in Example 1. The as-spun fiber properties were as follows:

| Tenacity (T): | 2.5 gm/denier; |
|---|---|
| Elongation (E) | 1%; |
| Modulus (M) | 310 gm/denier |

Example 8

Example 1 was substantially repeated in Example 8 with the exception that the reaction was conducted employing the following amounts of reactants:

| HBA | 552 grams (4 moles) |
|---|---|
| DMNDC | 488 grams (2 moles) |
| TA | 166 grams (1 mole) |
| HQ | 330 grams (3 moles) |
| DBTO | 2.5 grams (1920 ppm as DBTO or 950 ppm as Sn in the resulting polymer) |

| | |
|---|---|
| Acetic anhydride | 1056 grams (10 moles, +2.5 mole % excess of 99 mol % purity |
| Acetic acid | 180 grams (3 moles) |

The torque on the stirrer during vacuum stage increased only by about 20 mvolts. The resulting polymer properties were as follows:

| | |
|---|---|
| IV, dL/g | 2.2 |
| Tm, °C. | 295 |
| Hm, joules/gram | 5.1 |
| Tc, °C. | 252 |
| Hc, joules/gram | −4.3 |

The MV of the polymer at 300° C. was as follows:

| | |
|---|---|
| 100 sec$^{-1}$ | 549 poise |
| 1000 sec$^{-1}$ | 263 poise |

The resulting polymer was melt spun into single filament fiber at a melt temperature of about 310° C. as described in Example 1. The as-spun fiber was heat treated as follows: fiber at ambient temperature was heated to 150° C. for 60 min.; heated to 230° C. in 60 min. held at 230° C. for 3 hours; and finally heated to 270° C. for 16 hours. The as-spun and heat treated fiber properties were as follows:

| | As-spun | Heat Treated |
|---|---|---|
| Tenacity (T): | 3.5 gm/denier | 12.5 gm/denier |
| Elongation (E) | 1.2% | 2.7% |
| Modulus (M) | 363 gm/denier | 417 gm/denier |

Comparative Example 1

Example 1 was substantially repeated in Comparative Example 1 with the exception that acetic acid was not used. The torque on the stirrer during vacuum stage increased only by about 23 mvolts. The resulting polymer properties were as follows:

| | |
|---|---|
| IV, dL/g | 2.1 |
| Tm, °C. | 297 |
| Hm, joules/gram | 3.4 |
| Tc, °C. | 260 |
| Hc, joules/gram | −2.7 |

The MV of the polymer at 300° C. was as follows:

| | |
|---|---|
| 100 sec$^{-1}$ | 3085 poise |
| 1000 sec$^{-1}$ | 788 poise |

The resulting polymer was very brittle and could not be compounded with glass for molding into test bars as well as the polymer sample was not spinnable to form fibers.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. An one step process for the preparation of high molecular weight aromatic polyesters, which comprises the step of reacting at least one dialkyl ester of an aromatic dicarboxylic acid with one or more of dihydric phenols and a hydroxy aromatic carboxylic acid in the presence of:
    (a) a condensing agent;
    (b) a catalyst selected from the group consisting of derivatives of Group I metals, derivatives of Group IV A metals, derivatives of Group IV B metals, and mixtures thereof; and
    (c) a co-catalyst selected from the group consisting of methanesulfonic acid, sulfuric acid, p-toluenesulfonic acid, oxalic acid, alkanoic acid having the formula, $C_nH_xF_yCOOH$, where n is an integer from 1 to 4, x and y are integers from 0 to 2n+1, and the sum of x and y is 2n+1, and mixtures thereof;

at suitable temperature and pressure conditions and for a sufficient period of time to form the aromatic polyester of high molecular weight capable of forming into shaped articles.

2. The process according to claim 1 wherein said dialkyl ester of an aromatic dicarboxylic acid is selected from the group consisting of alkyl esters of terephthalic acid, isophthalic acid, a naphthalene dicarboxylic acid, a biphenyl dicarboxylic acid, a bis-aryl dicarboxylic acid having the structure:

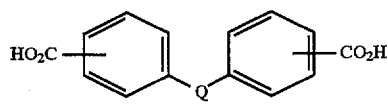

and mixtures thereof, wherein the alkyl group contains 1 to 4 carbon atoms, and Q is independently selected from the group consisting of S, O, CO, SO, $SO_2$, $C(CH_3)_2$ and $C(CF_3)_2$.

3. The process according to claim 1 wherein said dialkyl ester of an aromatic dicarboxylic acid is selected from the group consisting of dimethyl terephthalate, dimethyl isophthalate, dimethyl 2,6-naphthalene-di-carboxylate, dimethyl 4,4'-bibenzoate, and mixtures thereof.

4. The process according to claim 1 wherein said dihydric phenols are selected from the group consisting of hydroquinone, resorcinol, a biphenol, a dihydroxy naphthalene, bisphenol-A, halosubstituted bisphenol-A, alkyl substituted bisphenol-A, bis-dihydroxy aryl moieties having the structure:

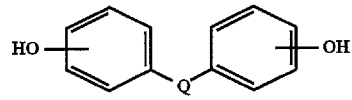

and mixtures thereof, wherein Q is independently selected from the group consisting of S, O, CO, SO, $SO_2$, and $C(CF_3)_2$.

5. The process according to claim 1 wherein said dihydric phenols are selected from the group consisting of hydroquinone, resorcinol, 4,4'-biphenol, 3,4'-biphenol, 2-phenyl hydroquinone, 2,6-dihydroxynaphthalene, 2,7-dihydroxynaphthalene, and mixtures thereof.

6. The process according to claim 1 wherein said hydroxy aromatic carboxylic acid is selected from the group consisting of 4-hydroxybenzoic acid, 3-hydroxybenzoic acid, 2,6-hydroxynaphthoic acid, 2,7-hydroxynaphthoic acid, 4-(4'-hydroxyphenyl)benzoic acid, 4-(3'-hydroxyphenyl)benzoic acid, and mixtures thereof.

7. The process according to claim 1 wherein said condensing agent is an alkanoic acid anhydride of the formula, $(C_nH_xF_yCO)_2O$, where n is an integer from 1 to 4, x and y are integers from 0 to 2n+1, and the sum of x and y is 2n+1.

8. The process according to claim 1 wherein said condensing agent is acetic anhydride.

9. The process according to claim 1 wherein said catalyst is selected from the group consisting of lithium acetate, sodium acetate, potassium acetate, cesium acetate, stannic acid, butylstannoic acid, stannous octanoate, dibutyltin oxide, tin butoxide, dibutyltin diesters, di-n-butyl tin dilaurate, titanium tetrabutoxide, titanium propoxide, titanium phenoxide, zirconium butoxide, silicon phenoxide, and mixtures thereof.

10. The process according to claim 1 wherein said catalyst is dibutyl tin oxide and is present in the amount of from about 100 parts per million to about 3000 parts per million based on the total weight of the aromatic polyester that is being formed.

11. The process according to claim 1 wherein said co-catalyst is acetic acid and is present in the amount of from about 30 mol % to about 300 mol % with reference to said dialkyl ester of an aromatic dicarboxylic acid.

12. An one step process for the preparation of high molecular weight thermotropic aromatic polymer, which comprises the step of reacting at least one dialkyl ester of an aromatic dicarboxylic acid with one or more of dihydric phenols, an aromatic dicarboxylic acid, an aromatic diamine or its derivative, a hydroxy aromatic amine or its derivative, and a hydroxy aromatic carboxylic acid in the presence of:

(a) a condensing agent;

(b) a catalyst selected from the group consisting of derivatives of Group I metals, derivatives of Group IV A metals, derivatives of Group IV B metals, and mixtures thereof; and (c) a co-catalyst selected from the group consisting of methanesulfonic acid, sulfuric acid, p-toluenesulfonic acid, alkanoic acid having the formula, $C_nH_xF_yCOOH$, where n is an integer from 1 to 4, x and y are integers from 0 to 2n+1, and the sum of x and y is 2n+1, and mixtures thereof;

at suitable temperature and pressure conditions and for a sufficient period of time to form the thermotropic aromatic polymer of high molecular weight capable of forming into shaped articles by a suitable molding or extrusion process.

13. The process according to claim 12 wherein said dialkyl ester of an aromatic dicarboxylic acid is selected from the group consisting of alkyl esters of terephthalic acid, isophthalic acid, a naphthalene dicarboxylic acid, a biphenyl dicarboxylic acid, a bis-aryl dicarboxylic acid having the structure:

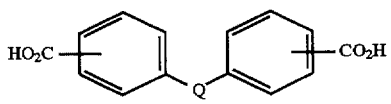

and mixtures thereof, wherein the alkyl group contains 1 to 4 carbon atoms, and Q is independently selected from the group consisting of S, O, CO, SO, $SO_2$, and $C(CF_3)_2$.

14. The process according to claim 12 wherein said dialkyl ester of an aromatic dicarboxylic acid is selected from the group consisting of dimethyl terephthalate, dimethyl isophthalate, dimethyl 2,6-naphthalene-dicarboxylate, dimethyl 4,4'-bibenzoate, and mixtures thereof.

15. The process according to claim 12 wherein said dihydric phenols are selected from the group consisting of hydroquinone, resorcinol, a biphenol, a dihydroxy naphthalene, bis-dihydroxy aryl moieties having the structure:

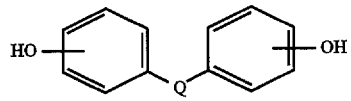

and mixtures thereof, wherein Q is independently selected from the group consisting of S, O, CO, SO, $SO_2$, and $C(CF_3)_2$.

16. The process according to claim 12 wherein said dihydric phenols are selected from the group consisting of hydroquinone, resorcinol, 4,4'-biphenol, 3,4'-biphenol, 2-phenyl hydroquinone, 2,6-dihydroxynaphthalene, 2,7-dihydroxynaphthalene, and mixtures thereof.

17. The process according to claim 12 wherein said aromatic dicarboxylic acid is selected from the group consisting of terephthalic acid, isophthalic acid, 2,6-naphthalene dicarboxylic acid, 2,7-naphthalene dicarboxylic acid, 4,4'-biphenyl dicarboxylic acid, 3,4'-biphenyl dicarboxylic acid, a bis-aryl dicarboxylic acid having the structure:

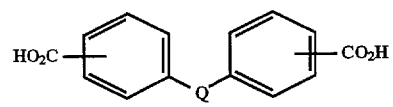

and mixtures thereof, wherein Q is independently selected from the group consisting of S, O, CO, SO, $SO_2$, and $C(CF_3)_2$.

18. The process according to claim 12 wherein said aromatic diamine or its derivative is selected from the group consisting of 1,3-diaminobenzene, 1,3-diacetamidobenzene, 1,4-diaminobenzene, 1,4-diacetamidobenzene, 2,6-diaminonaphthalene, 2,6-diacetamidonaphthalene, 2,7-diaminonaphthalene, 2,7-diacetamidonaphthalene, 4,4'-diaminobiphenyl, 4,4'-diacetamidobiphenyl, 3,4'-diaminobiphenyl, 3,4'-diacetamido biphenyl, a bis-aryl diamine or its derivative having the structure:

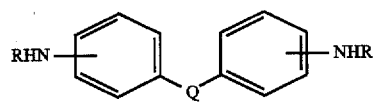

and mixtures thereof, wherein R is either H or —$COCH_3$, and Q is independently selected from the group consisting of S, O, CO, SO, $SO_2$, and $C(CF_3)_2$.

19. The process according to claim 12 wherein said hydroxy aromatic amine or its derivative is selected from the group consisting of 1-hydroxy-3-aminobenzene, 1-acetoxy-3-acetamidobenzene, 1-hydroxy-4-aminobenzene, 1-acetoxy-4-acetamido-benzene, 2-hydroxy-6-aminonaphthalene, 2-acetoxy-6-acetamidonaphthalene, 2-hydroxy-7-aminonaphthalene, 2-acetoxy-7-acetamido naphthalene, 4-hydroxy-4'-aminobiphenyl, 4-acetoxy-4'-acetamidobiphenyl, 3-hydroxy-4'-aminobiphenyl, 3-acetoxy-4'-acetamidobiphenyl, a bis-aryl hydroxy amine or its derivative having the structure:

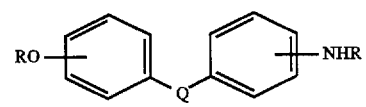

and mixtures thereof, wherein R is either H or —$COCH_3$, and Q is independently selected from the group consisting of S, O, CO, SO, $SO_2$, and $C(CF_3)_2$.

20. The process according to claim 12 wherein said hydroxy aromatic carboxylic acid is selected from the group consisting of 4-hydroxybenzoic acid, 3-hydroxybenzoic acid, 2,6-hydroxynaphthoic acid, 2,7-hydroxynaphthoic acid, 4-(4'-hydroxyphenyl)benzoic acid, 4-(3'-hydroxyphenyl)benzoic acid, and mixtures thereof.

21. The process according to claim 12 wherein said condensing agent is an alkanoic acid anhydride of the formula, $(C_nH_xF_yCO)_2O$, where n is an integer from 1 to 4, x and y are integers from 0 to 2n+1, and the sum of x and y is 2n+1.

22. The process according to claim 12 wherein said condensing agent is acetic anhydride.

23. The process according to claim 12 wherein said catalyst is selected from the group consisting of lithium acetate, sodium acetate, potassium acetate, cesium acetate, stannic acid, butylstannoic acid, stannous octanoate, dibutyltin oxide, tin butoxide, dibutyltin diesters, di-n-butyl tin dilaurate, titanium tetrabutoxide, titanium propoxide, titanium phenoxide, zirconium butoxide, silicon phenoxide, and mixtures thereof.

24. The process according to claim 12 wherein said catalyst is dibutyl tin oxide and is present in the amount of from about 100 parts per million to about 3000 parts per million based on the total weight of the aromatic polymer that is being formed.

25. The process according to claim 12 wherein said co-catalyst is acetic acid and is present in the amount of from about 30 mol % to about 300 mol % with reference to said dialkyl ester of an aromatic dicarboxylic acid.

26. The process according to claim 12 wherein said polymer has an inherent viscosity greater than or equal to about 1.0 dL/g when dissolved in a concentration of 0.1 wt % in a mixture of equal volumes of hexafluoroisopropanol and pentafluorophenol at 25° C.

27. The process according to claim 12 wherein said polymer has an inherent viscosity greater than or equal to about 1.5 dL/g when dissolved in a concentration of 0.1 wt % in a mixture of equal volumes of hexafluoroisopropanol and pentafluorophenol at 25° C.

28. The process according to claim 12 wherein said polymer has a weight average molecular weight greater than or equal to about 2,000.

29. An one step process for the preparation of high molecular weight thermotropic aromatic polymer, which comprises the step of reacting at least one dialkyl ester of an aromatic dicarboxylic acid with one or more of dihydric phenols, an aromatic dicarboxylic acid, a hydroxy aromatic amine or its derivative, and a hydroxy aromatic carboxylic acid in the presence of:

(a) acetic anhydride;

(b) a catalyst selected from the group consisting of potassium acetate, dibutyl tin oxide, and mixtures thereof;

(c) a co-catalyst selected from the group consisting of acetic acid, trifluoroacetic acid, and mixtures thereof;

at temperatures from about 260° to about 380° C. for a sufficient period of time, and continually removing methyl acetate formed as a by-product from the reaction mixture to form the thermotropic aromatic polymer of high molecular weight capable of forming into shaped articles by molding or extrusion.

30. The process according to claim 29 wherein said dialkyl ester of an aromatic dicarboxylic acid is dimethyl 2,6-naphthalene-di-carboxylate.

31. The process according to claim 29 wherein said dihydric phenols are selected from the group consisting of hydroquinone, 4,4'-biphenol, 2,6-dihydroxynaphthalene, and mixtures thereof.

32. The process according to claim 29 wherein said aromatic dicarboxylic acid is selected from the group consisting of terephthalic acid, isophthalic acid, 2,6-naphthalene dicarboxylic acid, 4,4'-biphenyl dicarboxylic acid, and mixtures thereof.

33. The process according to claim 29 wherein said hydroxy aromatic amine or its derivative is 1-hydroxy-4-aminobenzene or 1-acetoxy-4-acetamidobenzene.

34. The process according to claim 29 wherein said hydroxy aromatic carboxylic acid is selected from the group consisting of 4-hydroxybenzoic acid, 2,6-hydroxynaphthoic acid, and mixtures thereof.

35. The process according to claim 29 wherein total amounts of said hydroxy or amino aromatic compounds are about equal to total amounts of said aromatic carboxylic compounds on a mole basis.

36. The process according to claim 29 wherein said acetic anhydride is present in sufficient amounts to convert all of the hydroxyl or amino groups of said hydroxy or amino aromatic monomers to acetate esters or amides.

37. The process according to claim 29 wherein the amount of said acetic anhydride is greater than or equal to the sum of the number of moles of said hydroxy aromatic carboxylic acid, and twice the number of moles of said dihydric phenols or said hydroxy aromatic amine.

38. The process according to claim 29 wherein said catalyst is dibutyl tin oxide and is present in the amount of from about 100 parts per million to about 3000 parts per million based on the total weight of the aromatic polymer that is being formed.

39. The process according to claim 29 wherein said co-catalyst is acetic acid and is present in the amount of from about 30 mol % to about 300 mol % with reference to said dialkyl ester of an aromatic dicarboxylic acid.

40. The process according to claim 29 wherein said polymer has an inherent viscosity greater than or equal to about 1.0 dL/g when dissolved in a concentration of 0.1 wt % in a mixture of equal volumes of hexafluoroisopropanol and pentafluorophenol at 25° C.

41. The process according to claim 29 wherein said polymer has an inherent viscosity greater than or equal to about 1.5 dL/g when dissolved in a concentration of 0.1 wt % in a mixture of equal volumes of hexafluoroisopropanol and pentafluorophenol at 25° C.

42. The process according to claim 29 wherein said polymer has a weight average molecular weight greater than or equal to about 2,000.

43. A product produced in accordance with the process of claim 1.

44. A product produced in accordance with the process of claim 12.

45. A product produced in accordance with the process of claim 29.

* * * * *